(12) United States Patent
Chung et al.

(10) Patent No.: US 12,422,855 B2
(45) Date of Patent: Sep. 23, 2025

(54) WHEELED ROBOT AND CONTROL METHOD THEREOF

(71) Applicants: Hyundai Motor Company, Seoul (KR); Kia Corporation, Seoul (KR); MOBINN Inc., Daegu (KR)

(72) Inventors: Hoon Chung, Hwaseong-si (KR); Jin Choi, Seoul (KR); Sun Myoung Jo, Ansan-si (KR)

(73) Assignees: Hyundai Motor Company, and, Seoul (KR); Kia Corporation, and, Seoul (KR); MOBINN Inc., Daegu (KR)

( * ) Notice: Subject to any disclaimer, the term of this patent is extended or adjusted under 35 U.S.C. 154(b) by 235 days.

(21) Appl. No.: 18/320,966

(22) Filed: May 20, 2023

(65) Prior Publication Data

US 2024/0126272 A1 Apr. 18, 2024

(30) Foreign Application Priority Data

Oct. 17, 2022 (KR) .......................... 1020220133068

(51) Int. Cl.
*G05D 1/08* (2006.01)
*G05D 1/00* (2006.01)

(52) U.S. Cl.
CPC ........... *G05D 1/0891* (2013.01); *G05D 1/027* (2013.01); *G05D 1/0272* (2013.01)

(58) Field of Classification Search
CPC ..... G05D 1/0891; G05D 1/027; G05D 1/0272
See application file for complete search history.

(56) References Cited

U.S. PATENT DOCUMENTS

| | | | |
|---|---|---|---|
| 2006/0097683 A1 | 5/2006 | Hosoda et al. | |
| 2008/0173493 A1 | 7/2008 | Adachi | |
| 2009/0030597 A1 | 1/2009 | Fuwa et al. | |
| 2010/0219011 A1* | 9/2010 | Shimoyama | B62D 37/04 180/218 |
| 2011/0054681 A1 | 3/2011 | Amino et al. | |
| 2011/0118968 A1* | 5/2011 | Takenaka | B62K 11/007 701/124 |

FOREIGN PATENT DOCUMENTS

| | | |
|---|---|---|
| JP | 2008-230548 | 10/2008 |
| JP | 4985420 B2 | 7/2012 |
| KR | 10-1738134 | 5/2017 |

* cited by examiner

*Primary Examiner* — Todd Melton
*Assistant Examiner* — Matthew Ho
(74) *Attorney, Agent, or Firm* — Fish & Richardson P.C.

(57) ABSTRACT

A robot includes a body, a pair of wheels rotatably provided at a lower part of the body, a cargo box provided at an upper part of the body, an inertial measurement sensor configured to measure a tilt angle of the body, a pair of wheel encoders configured to measure a rotational angle of each of the pair of wheels, a cargo box encoder configured to measure a tilt angle of the cargo box, a pair of wheel motors configured to transmit a torque to each of the pair of wheels, a cargo box motor configured to transmit a torque to the cargo box, and a controller. The controller is configured to control the pair of wheel motors and the cargo box motor to allow the robot to make a double axis inverted pendulum motion on an axis of each of the pair of wheels and the cargo box.

20 Claims, 10 Drawing Sheets

| $\dot{\theta}_1 = 0$ | $\ddot{\theta}_1 = 0$ |
|---|---|
| $\dot{\theta}_2 = 0$ | $\ddot{\theta}_2 = 0$ |
| $\dot{\phi} = Const.$ | $\ddot{\phi} = 0$ |

$\theta_1$ : TILT ANGLE OF BODY

$\theta_2$ : TILT ANGLE OF CARGO BOX $\phi$ : ROTATIONAL ANGLE OF WHEEL

WHEELED ROBOT AND CONTROL METHOD THEREOF

CROSS-REFERENCE TO RELATED APPLICATION

This application is based on and claims priority under 35 U.S.C. § 119 to Korean Patent Application No. 10-2022-0133068, filed on Oct. 17, 2022 in the Korean Intellectual Property Office, the disclosure of which is incorporated herein by reference.

TECHNICAL FIELD

The disclosure relates to a robot and a control method thereof.

BACKGROUND

In general, a Segway-type robot may refer to a robot maintaining balance by measuring a movement and angle of a robot body, and a control system of the Segway-type robot typically uses a control method of maintaining a tilt angle of the body at 0 degrees.

For example, the Segway-type robot may maintain balance through movement and angle of the robot body by using an inverted pendulum motion. When encountering a large step or slope, however, maintaining a tilt angle of the body at 0 degrees may not be the most mechanically stable state, and thus normal control may not be performed.

SUMMARY

The present disclosure is directed to a robot and a control method thereof that may determine a tilt angle of a body and a tilt angle of a cargo box provided at an upper part of the body by estimating a slope of a current position to allow the robot to drive while maintaining balance.

According to an aspect of the subject matter described in this application, a robot can include: a body; a pair of wheels rotatably provided at a lower part of the body; a cargo box provided at an upper part of the body; an inertial measurement unit configured to measure a tilt angle of the body; a pair of wheel encoders configured to measure a rotational angle of each of the pair of wheels; a cargo box encoder configured to measure a tilt angle of the cargo box; a pair of wheel motors configured to transmit a torque to each of the pair of wheels; a cargo box motor configured to transmit a torque to the cargo box; and a controller configured to: control the pair of wheel motors and the cargo box motor to allow the robot to make a double axis inverted pendulum motion on an axis of each of the pair of wheels and the cargo box, based on an output of each of the inertial measurement unit, the pair of wheel encoders and the cargo box encoder, determine a slope of a current position based on the torque applied to the cargo box, the torque applied to the pair of wheels, and the tilt angle of the body, based on balance being achieved by the double axis inverted pendulum motion, and determine a ratio between the tilt angle of the body and the tilt angle of the cargo box based on the slope to allow the robot to drive while maintaining balance.

The controller is configured to control an observer to estimate the slope, using the output of each of the inertial measurement unit, the pair of wheel encoders and the cargo box encoder as state variables, and using the torque applied to the cargo box and the torque applied to the pair of wheels as control input.

The observer is configured to estimate the slope using a correlation among the state variables and the control inputs, a mass and a dimension of each of the body, the pair of wheels and the cargo box, and a gravitational acceleration.

The controller is configured to determine a target tilt angle of the body and a target tilt angle of the cargo box to allow the robot to drive while maintaining balance in the slope, based on the ratio between the tilt angle of the body and the tilt angle of the cargo box.

The controller is configured to control the observer to determine the ratio between the tilt angle of the body and the tilt angle of the cargo box in the slope by assuming that the tilt angle of the body, the tilt angle of the cargo box, and an angular speed of the pair of wheels are constant.

The controller is configured to determine the ratio between the tilt angle of the body and the tilt angle of the cargo box based on a slope determined in real time while driving, so that the target tilt angle of the cargo box is adaptively changed.

The controller is configured to determine the target tilt angle of the cargo box to allow the cargo box to be level, and determine the target tilt angle of the body based on a ratio among the determined target tilt angle of the cargo box, the tilt angle of the body, and the tilt angle of the cargo box.

The controller is configured to feedback-control the pair of wheel motors and the cargo box motor, based on an angular speed of the pair of wheels, the target tilt angle of the body, and the target tilt angle of the cargo box according to a movement command.

The controller is configured to determine a slope in each of the pair of wheels, and determine an average of the slope in each of the pair of wheels as the slope of the current position.

The controller is configured to compensate an output of each of the pair of wheel motors based on the slope in each of the pair of wheels.

According to one aspect of the subject matter described in this application, a control method of a robot including a body, a pair of wheels rotatably provided at a lower part of the body, and a cargo box provided at an upper part of the body, where the control method can include: controlling a pair of wheel motors and a cargo box motor to allow the robot to make a double axis inverted pendulum motion on an axis of each of the pair of wheels and the cargo box, based on an output of each of an inertial measurement unit, a pair of wheel encoders and a cargo box encoder, the pair of wheel motors configured to transmit a torque to each of the pair of wheels, the cargo box motor configured to transmit a torque to the cargo box, the inertial measurement unit configured to measure a tilt angle of the body, the pair of wheel encoders configured to measure a rotational angle of each of the pair of wheels, the cargo box encoder configured to measure a tilt angle of the cargo box; determining a slope of a current position based on the torque applied to the cargo box, the torque applied to the pair of wheels, and the tilt angle of the body, based on balance being achieved by the double axis inverted pendulum motion; and determining a ratio between the tilt angle of the body and the tilt angle of the cargo box based on the slope to allow the robot to drive while maintaining balance.

The determining of the slope includes controlling an observer to estimate the slope, using the output of each of the inertial measurement unit, the pair of wheel encoders and the cargo box encoder as state variables, and using the torque applied to the cargo box and the torque applied to the pair of wheels as control inputs.

The observer is configured to estimate the slope using a correlation among the state variables and the control inputs, a mass and a dimension of each of the body, the pair of wheels and the cargo box, and a gravitational acceleration.

The control method further includes determining a target tilt angle of the body and a target tilt angle of the cargo box to allow the robot to drive while maintaining balance in the slope, based on the ratio between the tilt angle of the body and the tilt angle of the cargo box.

The determining of the ratio between the tilt angle of the body and the tilt angle of the cargo box includes controlling the observer to determine the ratio between the tilt angle of the body and the tilt angle of the cargo box in the slope by assuming that the tilt angle of the body, the tilt angle of the cargo box, and an angular speed of the pair of wheels are constant.

The determining of the ratio between the tilt angle of the body and the tilt angle of the cargo box includes determining the ratio between the tilt angle of the body and the tilt angle of the cargo box based on a slope determined in real time while driving, so that the target tilt angle of the cargo box is adaptively changed.

The determining of the ratio between the tilt angle of the body and the tilt angle of the cargo box includes: determining the target tilt angle of the cargo box to allow the cargo box to be level; and determining the target tilt angle of the body based on a ratio among the determined target tilt angle of the cargo box, the tilt angle of the body, and the tilt angle of the cargo box.

The control method further includes feedback-controlling the pair of wheel motors and the cargo box motor, based on an angular speed of the pair of wheels, the target tilt angle of the body, and the target tilt angle of the cargo box according to a movement command.

The determining of the slope includes: determining a slope in each of the pair of wheels; and determining an average of the slope in each of the pair of wheels as the slope of the current position.

The control method further includes compensating an output of each of the pair of wheel motors based on the slope in each of the pair of wheels.

DETAILED DESCRIPTION

The terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

Figure 1:
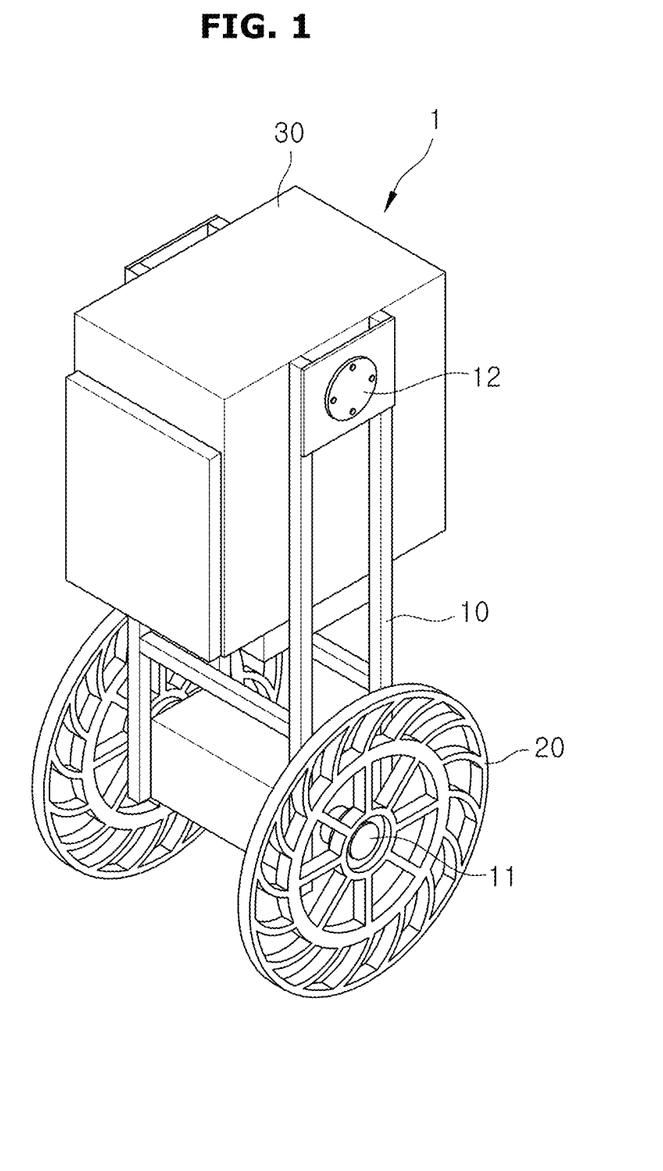
FIG. 1 illustrates an exterior of an example of a robot.
Figure 2:
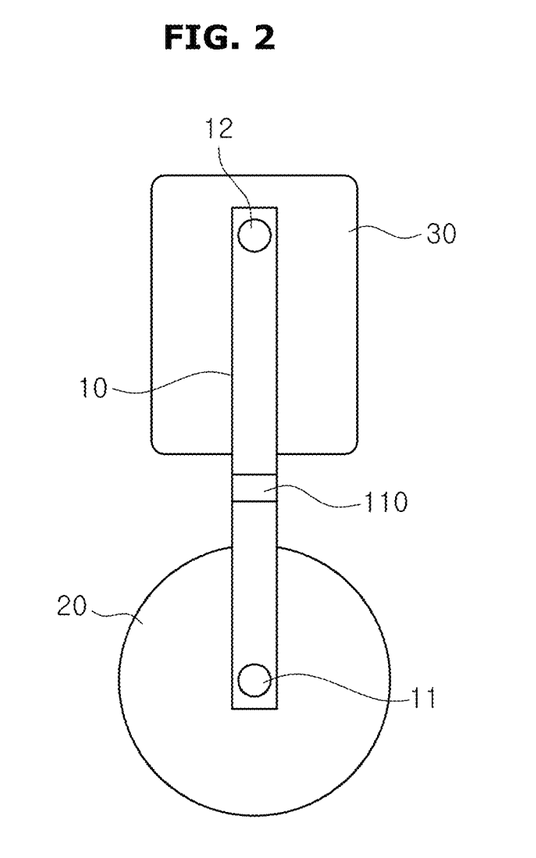
FIG. 2 is a side cross-sectional view schematically illustrating an example of a robot.

FIG. 1 illustrates an exterior of a robot. FIG. 2 is a side cross-sectional view schematically illustrating a robot.

Referring to FIGS. 1 and 2, a robot 1 can include a body 10, a pair of wheels 20 rotatably provided at a lower part of the body 10, and a cargo box 30 provided at an upper part of the body 10.

As shown in FIGS. 1 and 2, the body 10 includes a first rotation shaft 11 located at a lower part of the body and to which the pair of wheels 20 are attached, and a second rotation shaft 12 located at an upper part of the body and to which the cargo box 30 is attached.

On one side of the first rotation shaft 11 in the body 10, a pair of wheel motors transmitting a torque to each of the pair of wheels 20 and a pair of wheel encoders measuring a rotational angle of each of the pair of wheels 20 may be provided.

On one side of the second rotation shaft 12, a cargo box motor transmitting a torque to the cargo box 30 and a cargo box encoder measuring a tilt angle of the cargo box 30 may be provided.

Also, an inertial measurement unit (IMU) 110 measuring a tilt angle of the body 10 may be provided on one side of the body 10. In this instance, the tilt angle of the body 10 may refer to an angle between the body 10 and a vertical axis perpendicular to the ground.

In this instance, the robot 1 may control the pair of wheel motors and the cargo box motor to allow the robot to make a double axis inverted pendulum motion on the axis and of each of the pair of wheels 20 and the cargo box 30, based on an output of each of the inertial measurement unit 110, the pair of wheel encoders and the cargo box encoder. As such, the robot 1 may achieve balance by the double axis inverted pendulum motion.

Each of the pair of wheels 20 can be provided as a flexible tire capable of being deformed in a direction from a circumference to a center, allowing the robot 1 to drive while maintaining balance even in a large step or slope.

The cargo box 30 can be loaded with items to be transported by the robot 1, and be provided with the cargo box motor transmitting torque to the cargo box 30, the cargo box encoder measuring the tilt angle of the cargo box 30, and the like.

Figure 3:
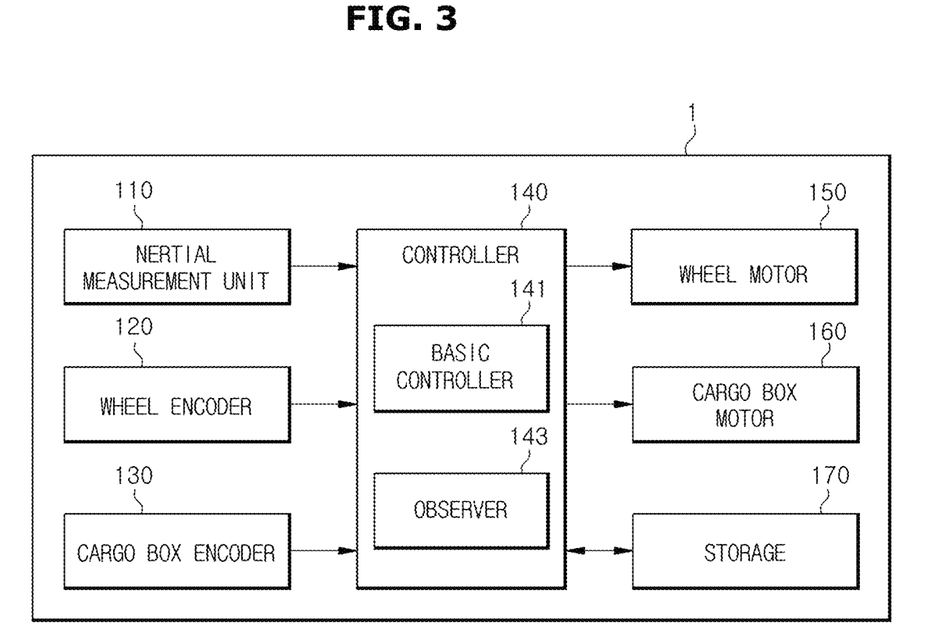
FIG. 3 is a control block diagram illustrating an example of a robot.

FIG. 3 is a control block diagram illustrating the robot 1.

Referring to FIG. 3, the robot 1 can include the inertial measurement unit 110, a pair of wheel encoders 120, a cargo box encoder 130, a controller 140, a pair of wheel motors 150, a cargo box motor 160, and a storage 170. Here, the inertial measurement unit 110 measures a tilt angle of the body 10, the pair of wheel encoders 120 measures a rotational angle of each of the pair of wheels 20, the cargo box encoder 130 measures a tilt angle of the cargo box 30, the controller 140 controls a double axis inverted pendulum motion, the pair of wheel motors 150 transmits a torque to each of the pair of wheels 20, the cargo box motor 160 transmits a torque to the cargo box 30, and the storage 170 stores various information required for control.

In some implementations, the inertial measurement unit 110 is provided on one side of the body 10, and may measure how much the body 10 is tilted from a vertical axis perpendicular to the ground.

In some implementations, the wheel encoder 120 may be provided integrally with the wheel motor 150, and measure a rotational angle of the wheel 20 by measuring a rotational angle of the wheel motor 150. The pair of wheel encoders 120 may be provided as a known type of encoder.

In some implementations, the cargo box encoder 130 may be provided integrally with the cargo box motor 160 and measure the tilt angle of the cargo box 30 by measuring a rotational angle of the cargo box motor 160. The cargo box encoder 130 may be provided as a known type of encoder.

In some implementations, the controller 140 may include a basic controller 141 performing feedback-control and an observer 143 estimating a slope (disturbance) at a current position of the robot 1.

When a target tilt angle of the body 10 and a target tilt angle of the cargo box 30 are determined, the basic controller 141 may control the wheel motor 150 and the cargo box motor 160 so that the tilt angle of the body 10 and the tilt angle of the cargo box 30 become the target tilt angle of the body 10 and the target tilt angle of the cargo box 30, respectively. Through the above, the basic controller 141 may allow the robot 1 to drive while maintaining balance.

The observer 143 may determine the slope of the current position based on the tilt angle of the body 10, the torque applied to the pair of wheels 20, and the torque applied to the cargo box 30. Operations of the observer 143 are described in detail later.

In some implementations, the controller 140 may control the pair of wheel motors 150 and the cargo box motor 160 to allow the robot to make a double axis inverted pendulum motion on an axis of each of the pair of wheels 20 and the cargo box 30, based on an output of each of the inertial measurement unit 110, the pair of wheel encoders 120 and the cargo box encoder 130.

In this instance, the controller 140 may control the basic controller 141 to allow the robot to make a double axis inverted pendulum motion, using an output of each of the inertial measurement unit 110, the pair of wheel encoders 120 and the cargo box encoder 130 as state variables, and using the torque applied to the cargo box 30 and the torque applied to the pair of wheels 20 as control input.

The basic controller 141 may use a correlation among the state variables and the control inputs, so that the robot 1 makes double axis inverted pendulum motion.

In some implementations, when balance is achieved by the double axis inverted pendulum motion, the controller 140 may determine the slope of the current position based on the tilt angle of the body 10, the torque applied to the pair of wheels 20, and the torque applied to the cargo box 30.

The controller 140 may control the observer 143 to estimate the slope, using an output of each of the inertial measurement unit 110, the pair of wheel encoders 120 and the cargo box encoder 130 as state variables, and using the torque applied to the cargo box 30 and the torque applied to the pair of wheels 20 as control inputs.

In this instance, the observer 143 may estimate the slope using the correlation among the state variables and the control inputs, a mass and a dimension of each of the body 10, the pair of wheels 20 and the cargo box 30, and a gravitational acceleration.

In some implementations, the controller 140 may determine a ratio between the tilt angle of the body 10 and the tilt angle of the cargo box 30 based on the slope to allow the robot to drive while maintaining balance.

In this instance, the controller 140 may control the observer 143 to determine the ratio between the tilt angle of the body 10 and the tilt angle of the cargo box 30 in the slope, by assuming that the tilt angle of the body 10, the tilt angle of the cargo box 30, and an angular speed of the pair of wheels 20 are constant.

The controller 140 may determine a target tilt angle of the body 10 and a target tilt angle of the cargo box 30, based on the ratio between the tilt angle of the body 10 and the tilt angle of the cargo box 30. Here, the target tilt angle of the body 10 and the target tilt angle of the cargo box 30 are for allowing the robot to drive in the slope while maintaining balance.

For example, by determining the ratio between the tilt angle of the body 10 and the tilt angle of the cargo box 30 based on a slope determined in real time while driving, the controller 140 may allow the target tilt angle of the cargo box 30 to be adaptively changed.

Also, the controller 140 may determine the target tilt angle of the cargo box 30 to allow the cargo box 30 to be level, and determine the target tilt angle of the body 10 based on a ratio among the determined target tilt angle of the cargo box 30, the tilt angle of the body 10, and the tilt angle of the cargo box 30. In this instance, the target tilt angle of the cargo box 30 may correspond to "0" degree based on a vertical axis perpendicular to the ground.

In some implementations, the controller 140 may control the basic controller 141 to feedback-control the pair of wheel motors 150 and the cargo box motor 160, based on an angular speed of the pair of wheels 20, the target tilt angle of the body 10, and the target tilt angle of the cargo box 30 according to a movement command.

In some implementations, the controller 140 may determine the slope in each of the pair of wheels 20, and determine an average of the slope in each of the pair of wheels 20 as the slope of the current position.

In some implementations, the controller 140 may compensate an output of each of the pair of wheel motors 150 based on the slope in each of the pair of wheels 20, thereby allowing the robot 1 to drive without being shaken in yaw direction.

The controller 140 may include at least one memory storing a program for performing the aforementioned operations and operations described below, and at least one processor for implementing a stored program. When a plurality of memories and processors are provided, the plurality of memories and processors may be integrated into one chip, or provided in physically separated locations.

In some implementations, the wheel motor 150 may transmit a torque to the wheel 20, and be provided as a known type of motor. In this instance, the wheel motor 150 may include a left wheel motor transmitting a torque to a left wheel and a right wheel motor transmitting a torque to a right wheel.

In some implementations, the cargo box motor 160 may transmit a torque to the cargo box 30 and be provided as a known type of motor.

In some implementations, the storage 170 may store information such as the correlation among the state variables and the control inputs, the mass and the dimension of each of the body 10, the pair of wheels 20 and the cargo box 30, the gravitational acceleration, and the like. To this end, the storage 170 may be provided as a known type of recording medium.

Figure 4:
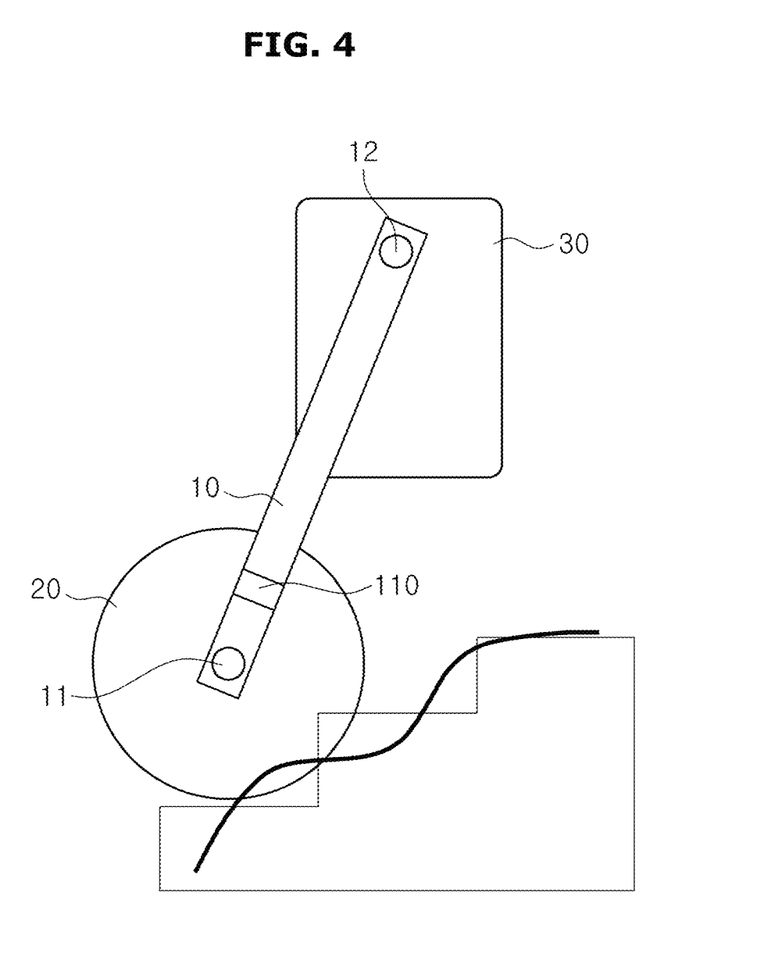
FIG. 4 is a diagram illustrating an example of a robot climbing a slope.
Figure 5:
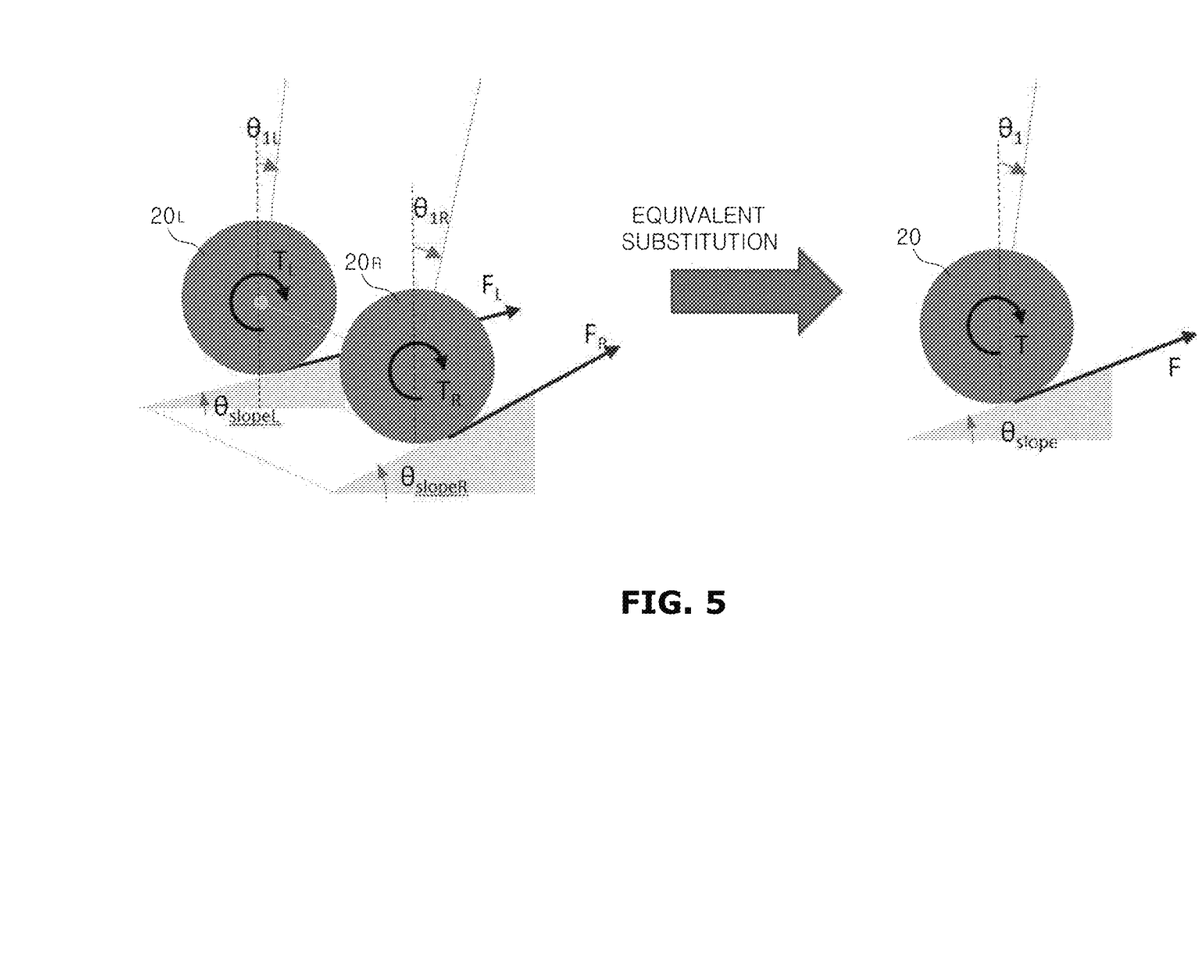
FIG. 5 is a diagram illustrating an example of determining a slope by a robot.
Figure 6:
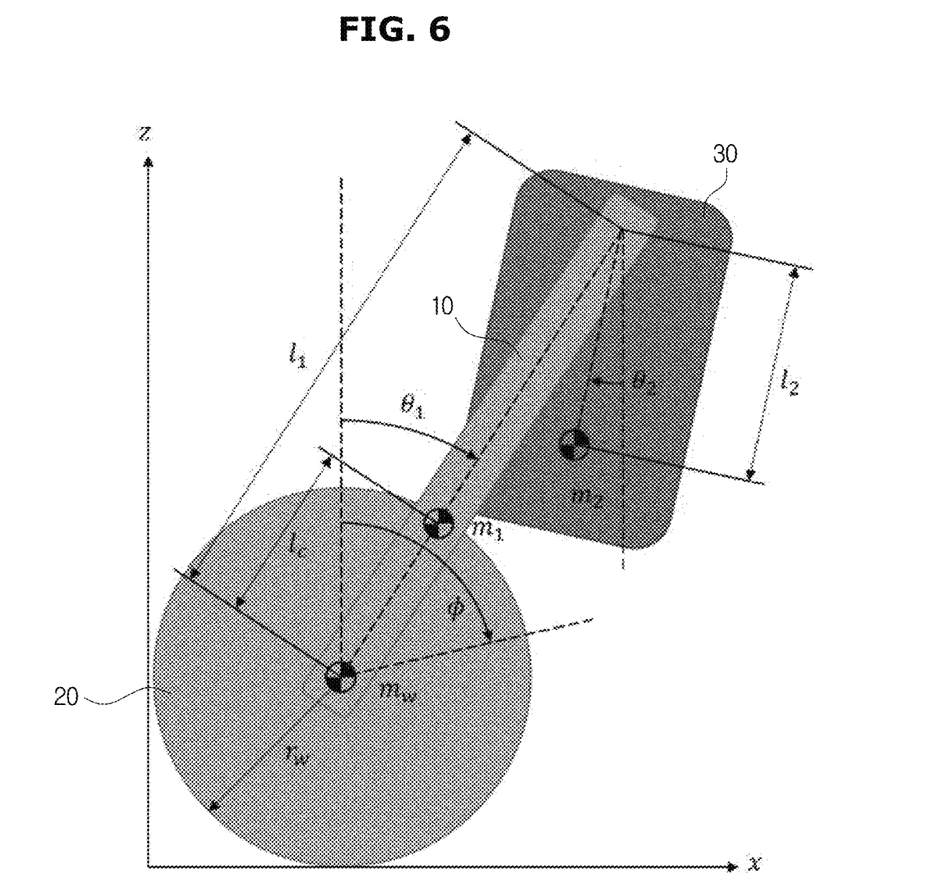
FIG. 6 is a diagram illustrating an example of determining a slope by an observer of a robot.

FIG. 4 is a diagram illustrating the robot 1 climbing a slope. FIG. 5 is a diagram illustrating an example of determining a slope by the robot 1. FIG. 6 is a diagram illustrating an example of determining a slope by the observer 143 of the robot 1.

Referring to FIG. 4, when climbing a slope, the robot 1 may estimate a slope of a current position, and adjust a tilt angle of each of the body 10 and the cargo box 30 based on the estimated slope.

In this instance, as shown in FIG. 4, when climbing stairs with large steps, the robot 1 may estimate the slope by substituting the stairs for a slope.

In some implementations, even when climbing a slope, the robot 1 may control the pair of wheel motors 150 and the cargo box motor 160 to make a double axis inverted pendulum motion on an axis of each of the pair of wheels 20 and the cargo box 30, based on an output of each of the inertial measurement unit 110, the pair of wheel encoders 120 and the cargo box encoder 130.

In this instance, the controller 140 may control the basic controller 141 to allow the robot to make a double axis inverted pendulum motion, using an output of each of the inertial measurement unit 110, the pair of wheel encoders 120 and the cargo box encoder 130 as state variables, and using the torque applied to the cargo box 30 and the torque applied to the pair of wheels 20 as control inputs.

The basic controller 141 may use a correlation among the state variables and the control inputs, so that the robot 1 makes double axis inverted pendulum motion.

In some implementations, when balance is achieved by the double axis inverted pendulum motion, the robot 1 may determine the slope of the current position based on the tilt angle of the body 10, the torque applied to the pair of wheels 20, and the torque applied to the cargo box 30.

In this instance, as shown in FIG. 5, the robot 1 may determine a slope ($\theta_{slopeL}$, $\theta_{slopeR}$) in each of the pair of wheels 20, and determine an average of the slope ($\theta_{slopeL}$, $\theta_{slopeR}$) in each of the pair of wheels 20 as the slope ($\theta_{slope}$) of the current position.

Specifically, each of the left and right sides of the robot 1 has a torque (T-L, T-R) to be applied to each of the wheels 20 and a tilt angle ($\theta1L$, $\theta1R$) of the body 10 to achieve balance in the given respective slope ($\theta_{slopeL}$, $\theta_{slopeR}$).

In this instance, a torque T to be applied to the entire robot 1 may be a sum of the torques (T-L and T-R) to be applied to the left wheel 20L and the right wheel 20R, respectively. (T=TL+TR)

In this instance, the torque T to be applied to the entire robot 1 may be expressed as Equation 1 below.

$$T = \frac{Mgr\sin(\theta_{slope})}{2} \cong \frac{Mgr\theta_{slope}}{2} \quad \langle\text{Equation 1}\rangle$$

Here, M may correspond to a mass of the robot 1, r may be a radius of the wheel, and g may be a gravitational acceleration.

Accordingly, the torques (T-L and T-R) to be applied to the left wheel 20L and the right wheel 20R, respectively, may be expressed as Equation 2 and Equation 3 below. That is, a half of a total mass of the robot may be reflected when calculating a slope of one side.

$$T\_L = \frac{1}{2}M\frac{gr\theta_{slope\_L}}{2} \quad \langle\text{Equation 2}\rangle$$

$$T\_R = \frac{1}{2}M\frac{gr\theta_{slope\_R}}{2} \quad \langle\text{Equation 3}\rangle$$

Considering T=TL+TR, as shown in <Equation 4>, the slope ($\theta_{slope}$) of the current position of the robot 1 may correspond to the average of the slope ($\theta_{slopeL}$, $\theta_{slopeR}$) of each of the pair of wheels 20.

$$\theta_{slope} = \frac{\theta_{slopeR} + \theta_{slopeL}}{2} \quad \langle\text{Equation 4}\rangle$$

In this instance, as shown in <Equation 5>, the tilt angle of the body 10 may correspond to the average of a tilt angle of the left body 10 and a tilt angle of the right body 10 in that the slope and the tilt angle of the body 10 correspond to each other.

$$\theta_1 = \frac{\theta_{1R} + \theta_{1L}}{2} \quad \langle\text{Equation 5}\rangle$$

Hereinafter, although it is described that the slope ($\theta_{slope}$) is determined based on the tilt angle $\theta1$ of the body 10, by <Equation 1> to <Equation 5>, it may be understood that the slope ($\theta_{slopeL}$, $\theta_{slopeR}$) of each of the pair of wheels 20 is determined by the tilt angle $\theta1L$ of the left body 10 and the tilt angle $\theta1R$ of the right body 10, and the average thereof is determined as the slope ($\theta_{slope}$).

The robot 1 may control the observer 143 to estimate the slope, using an output of each of the inertial measurement unit 110, the pair of wheel encoders 120 and the cargo box encoder 130 as state variables, and using the torque applied to the cargo box 30 and the torque applied to the pair of wheels 20 as control inputs.

In this instance, the observer 143 may estimate the slope using a correlation among the state variables and the control inputs, a mass and a dimension of each of the body 10, the pair of wheels 20 and the cargo box 30, and a gravitational acceleration.

That is, the observer 143 may determine the slope ($\theta_{slope}$) corresponding to a disturbance according to <Equation 6>.

$$C\begin{bmatrix} T_h \\ T_w \end{bmatrix} = M\begin{bmatrix} \ddot{\theta}_1 \\ \ddot{\theta}_2 \\ \ddot{\varphi} \end{bmatrix} + G\begin{bmatrix} \theta_1 \\ \theta_2 \\ \varphi \end{bmatrix} + D \quad \langle\text{Equation 6}\rangle$$

In this instance, as shown in FIG. 6, $\theta1$ and $\theta2$ may correspond to the tilt angle of the body 10 and the tilt angle of the cargo box 30, respectively. Also, $\varphi$ may correspond to a rotational angle of the wheel 20. The tilt angle $\theta1$ of the body 10 may be measured by the inertial measurement unit 110, the tilt angle $\theta2$ of the cargo box 30 may be measured by the cargo box encoder 130, and the rotational angle of the wheel 20 may be measured by the wheel encoder 120.

Also, $T_h$ is a torque applied to the cargo box 30, and $T_W$ is a torque applied to the wheel 20.

C is a matrix representing the correlation among the state variables ($\theta1$, $\theta2$, $\varphi$) and the control inputs ($T_h$, $T_W$). M is a matrix related to the mass and the dimension of each of the body 10, the pair of wheels 20 and the cargo box 30. G is a matrix related to the gravitational acceleration. D is a matrix representing a disturbance to be estimated by the observer 143.

For example, C may be expressed as <Equation 7>, and M may be expressed as <Equation 8> below.

$$C = \begin{bmatrix} -1 & -2 \\ 1 & 0 \\ 0 & 2 \end{bmatrix} \quad \text{<Equation 7>}$$

$$M = \begin{bmatrix} m_1 l_c^2 + m_2 l_1^2 + I_1 & -m_2 l_1 l_2 & (m_1 l_c + m_2 l_1) r_w \\ -m_2 l_1 l_2 & m_2 l_2^2 + I_2 & -m_2 r_w l_2 \\ (m_1 l_c + m_2 l_1) r_w & -m_2 r_w l_2 & (m_1 + m_2 + 2m_w) r_w^2 + 2J_w) \end{bmatrix} \quad \text{<Equation 8>}$$

Here, $m_1$, $m_2$ and $m_w$ correspond to the mass of the body 10, the cargo box 30, and the wheel 20, respectively. $l_1$, $l_2$ and $l_C$ correspond to a length of the body 10, a length of the cargo box 30, and a length from a center of mass of the wheel 20 to a center of mass of the body 10, respectively. $r_w$ corresponds to a radius of the wheel 20.

Also, G may be expressed as <Equation 9>, and D may be expressed as <Equation 10> below.

$$G = \begin{bmatrix} -(m_1 l_c + m_2 l_1)g & 0 & 0 \\ 0 & m_2 l_2 g & 0 \\ 0 & 0 & 0 \end{bmatrix} \quad \text{<Equation 9>}$$

$$D = \begin{bmatrix} 0 \\ 0 \\ (2m_w + m_1 + m_2) g r \theta_{slope} \end{bmatrix} \quad \text{<Equation 10>}$$

However, <Equation 7> to <Equation 10> are only examples of each matrix, and may be provided in various ways.

Figure 7:
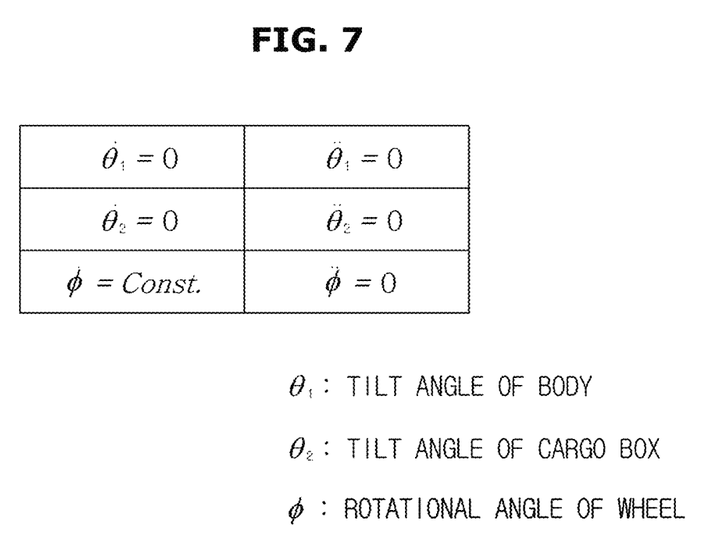
FIG. 7 illustrates an example where a normal state in which a robot drives in a balanced state is assumed.

FIG. 7 illustrates an example where a normal state in which the robot 1 drives in a balanced state is assumed.

Referring to FIG. 7, the robot 1 may determine a ratio between the tilt angle θ1 of the body 10 and the tilt angle θ2 of the cargo box 30 based on the slope (θslope), in order to drive while maintaining balance.

In this instance, the robot 1 may control the observer 143 to determine the ratio between the tilt angle of the body 10 and the tilt angle of the cargo box 30 in the slope, by assuming that the tilt angle θ1 of the body 10, the tilt angle θ2 of the cargo box 30, and an angular speed of the pair of wheels 20 are constant.

That is, as shown in FIG. 7, the robot 1 assumes that a value obtained by once differentiating the tilt angle θ1 of the body 10 and a value obtained by twice differentiating the tilt angle θ1 of the body 10 are 0, and a value obtained by once differentiating the tilt angle θ2 of the cargo box 30 and a value obtained by twice differentiating the tilt angle θ2 of the cargo box 30 are 0. Also, the robot 1 assumes that a value obtained by once differentiating the rotational angle φ of the wheel 20 is a constant and a value obtained by twice differentiating the rotational angle φ of the wheel 20 is 0.

In this instance, the robot 1 may reflect the values shown in FIG. 7 on <Equation 6>, thereby determining the ratio between the tilt angle θ1 of the body 10 and the tilt angle θ2 of the cargo box 30.

That is, <Equation 11> may be derived by reflecting the values shown in FIG. 7 on <Equation 6>, and the robot 1 may determine the ratio between the tilt angle θ1 of the body 10 and the tilt angle θ2 of the cargo box 30 based on <Equation 11>.

$$(2m_w + m_1 + m_2) r_w \sin(\theta_{slope}) = (m_1 l_c + m_2 l_1) \theta_1 - m_2 l_2 \theta_2 \quad \text{<Equation 11>}$$

The robot 1 may determine a target tilt angle of the body 10 and a target tilt angle of the cargo box 30, based on the ratio between the tilt angle of the body 10 and the tilt angle of the cargo box 30, to drive while maintaining balance in a slope.

For example, by determining the ratio between the tilt angle of the body 10 and the tilt angle of the cargo box 30 based on a slope determined in real time while driving, the robot 1 may allow the target tilt angle of the cargo box 30 to be adaptively changed.

Also, the robot 1 may determine the target tilt angle of the cargo box 30 to allow the cargo box 30 to be level, and determine the target tilt angle of the body 10 based on a ratio among the determined target tilt angle of the cargo box 30, the tilt angle of the body 10, and the tilt angle of the cargo box 30. In this instance, the target tilt angle of the cargo box 30 may correspond to "0" degree based on a vertical axis perpendicular to the ground.

In some implementations, the robot 1 may control the basic controller 141 to feedback-control the pair of wheel motors 150 and the cargo box motor 160, based on an angular speed of the pair of wheels 20, the target tilt angle of the body 10, and the target tilt angle of the cargo box 30 according to a movement command.

Figure 8:
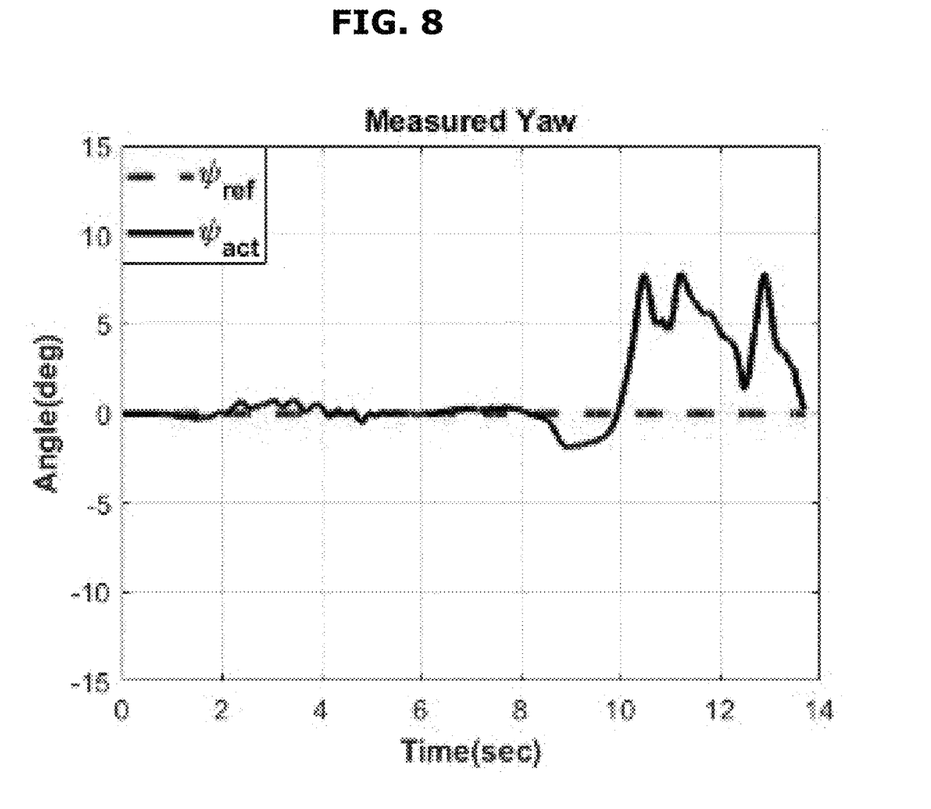
FIG. 8 illustrates a yaw error when an example of a robot compensates an output of each wheel motor based on a slope in each of a pair of wheels.

FIG. 8 illustrates a yaw error when the robot 1 compensates an output of each of the wheel motors 150 based on a slope in each of the pair of wheels 20.

Referring to FIG. 8, the robot 1 may compensate an output of each of the wheel motors 150 based on a slope in each of the pair of wheels 20, thereby allowing the robot 1 to drive without being shaken in yaw direction.

For example, when a left slope is greater than a right slope, the robot 1 may control the pair of wheel motors 150 so that a torque applied to the left wheel 20L is greater than a torque applied to the right wheel 20R.

Through the above, as shown in FIG. 8, a yaw error of the robot 1 may converge to a stable level.

Hereinafter, implementations of a control method of a robot according to an aspect of the disclosure are described. The robot 1 described above may be used in the control method of the robot. Accordingly, a description made with reference to FIGS. 1 to 8 may be equally applied to the control method of the robot.

Figure 9:
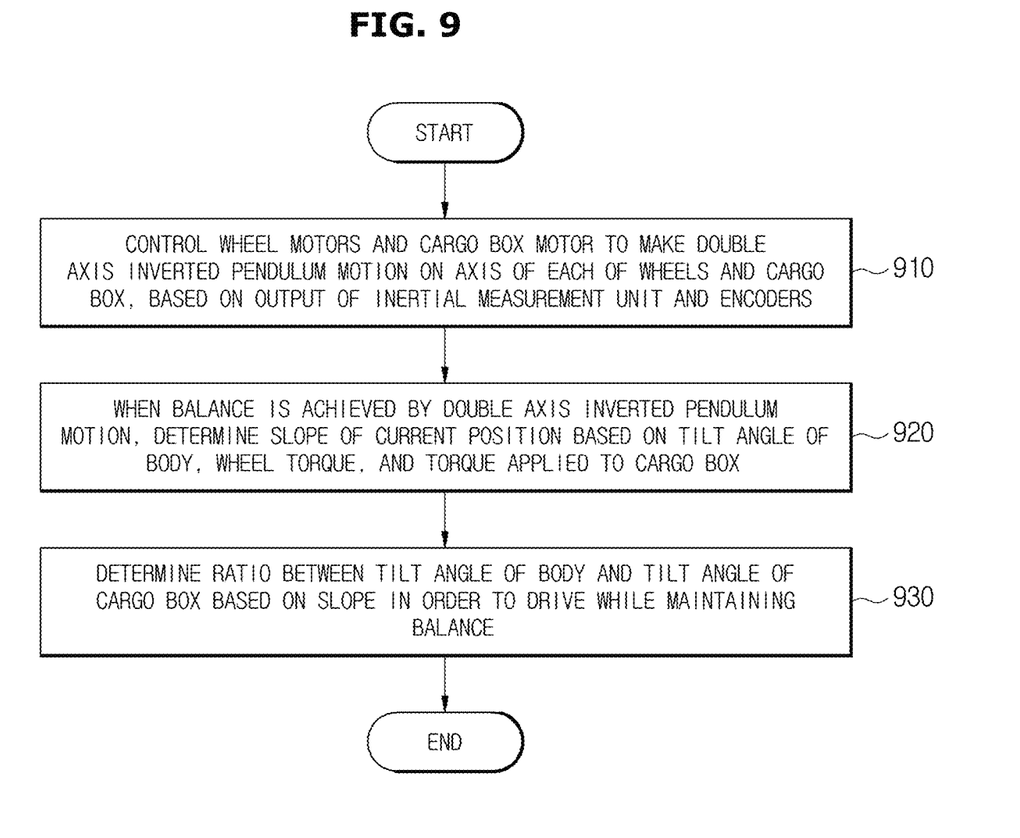
FIG. 9 is a flowchart illustrating exemplary operations of estimating a slope and determining a tilt angle of each of a body and a cargo box, in a control method of a robot.

FIG. 9 is a flowchart illustrating operations of estimating a slope and determining a tilt angle of each of the body 10 and the cargo box 30, in a control method of the robot 1.

Referring to FIG. 9, the robot 1 may control the pair of wheel motors 150 and the cargo box motor 160 to make a double axis inverted pendulum motion on an axis of each of the pair of wheels 20 and the cargo box 30, based on output of the inertial measurement unit 110 and the encoders 120 and 130 (910).

In this instance, the robot 1 may control the basic controller 141 to allow the robot to make a double axis inverted pendulum motion, using the output of each of the inertial measurement unit 110, the pair of wheel encoders 120 and the cargo box encoder 130 as state variables, and using a torque applied to the cargo box 30 and a torque applied to the pair of wheels 20 as control inputs.

The basic controller 141 may use a correlation among the state variables and the control inputs, so that the robot 1 makes double axis inverted pendulum motion.

In some implementations, when balance is achieved by the double axis inverted pendulum motion, the robot 1 may determine a slope of a current position based on a tilt angle of the body 10, the wheel torque, and the torque applied to the cargo box 30 (920).

In this instance, the robot 1 may determine a slope (θslopeL, θslopeR) in each of the pair of wheels 20, and determine an average of the slope (θslopeL, θslopeR) in each of the pair of wheels 20 as the slope (θslope) of the current position.

The robot 1 may control the observer 143 to estimate the slope, using the output of each of the inertial measurement unit 110, the pair of wheel encoders 120 and the cargo box encoder 130 as state variables, and using the torque applied to the cargo box 30 and the torque applied to the pair of wheels 20 as control inputs.

In this instance, the observer 143 may estimate the slope using the correlation among the state variables and the control inputs, a mass and a dimension of each of the body 10, the pair of wheels 20 and the cargo box 30, and a gravitational acceleration.

In some implementations, the robot 1 may determine a ratio between the tilt angle of the body 10 and a tilt angle of the cargo box 30 based on the slope to drive while maintaining balance (930).

In this instance, the robot 1 may control the observer 143 to determine the ratio between the tilt angle of the body 10 and the tilt angle of the cargo box 30 in the slope, by assuming that the tilt angle θ1 of the body 10, the tilt angle of the cargo box 30, and an angular speed of the pair of wheels 20 are constant.

That is, the robot 1 assumes that a value obtained by once differentiating the tilt angle θ1 of the body 10 and a value obtained by twice differentiating the tilt angle θ1 of the body 10 are 0, and a value obtained by once differentiating the tilt angle θ2 of the cargo box 30 and a value obtained by twice differentiating the tilt angle θ2 of the cargo box 30 are 0. Also, the robot 1 assumes that a value obtained by once differentiating a rotational angle φ of the wheel 20 is a constant and a value obtained by twice differentiating the rotational angle φ of the wheel 20 is 0.

The robot 1 may determine a target tilt angle of the body 10 and a target tilt angle of the cargo box 30 based on the ratio between the tilt angle of the body 10 and the tilt angle of the cargo box 30, to drive in the slope while maintaining balance.

For example, by determining the ratio between the tilt angle of the body 10 and the tilt angle of the cargo box 30 based on a slope determined in real time while driving, the robot 1 may allow the target tilt angle of the cargo box 30 to be adaptively changed.

Also, the robot 1 may determine the target tilt angle of the cargo box 30 to allow the cargo box 30 to be level, and determine the target tilt angle of the body 10 based on a ratio among the determined target tilt angle of the cargo box 30, the tilt angle of the body 10, and the tilt angle of the cargo box 30. In this instance, the target tilt angle of the cargo box 30 may correspond to "0" degree based on a vertical axis perpendicular to the ground.

In some implementations, the robot 1 may control the basic controller 141 to feedback-control the pair of wheel motors 150 and the cargo box motor 160, based on an angular speed of the pair of wheels 20, the target tilt angle of the body 10, and the target tilt angle of the cargo box 30 according to a movement command.

Figure 10:
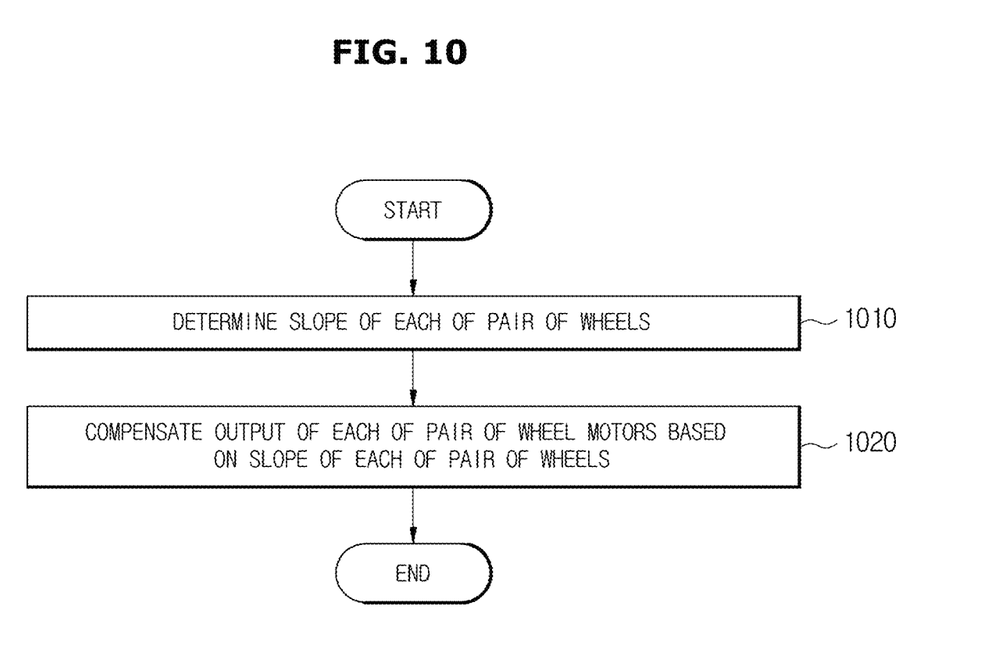
FIG. 10 is a flowchart illustrating exemplary operations of compensating an output of each wheel motor based on a slope in each of a pair of wheels, in a control method of a robot.

FIG. 10 is a flowchart illustrating operations of compensating an output of each of the wheel motors 150 based on a slope in each of the pair of wheels 20, in a control method of the robot 1.

Referring to FIG. 10, the robot 1 may determine a slope of each of the pair of wheels 20 (1010).

Afterwards, the robot 1 may compensate an output of each of the pair of wheel motors 150 based on the slope in each of the pair of wheels 20 (1020).

For example, when a left slope is greater than a right slope, the robot 1 may control the pair of wheel motors 150 so that a torque applied to the left wheel 20L is greater than a torque applied to the right wheel 20R.

Through the above, a yaw error of the robot 1 may converge to a stable level.

As is apparent from the above, in some implementations, the robot and the control method thereof can determine a tilt angle of a body and a tilt angle of a cargo box provided at an upper part of the body by estimating a slope of a current position, thereby allowing the robot to drive while maintaining balance.

For example, implementations can be stored in the form of a recording medium storing computer-executable instructions. The instructions may be stored in the form of a program code, and when executed by a processor, the instructions may perform operations of the disclosed implementations. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

What is claimed is:

1. A robot, comprising:
   a body;
   a pair of wheels rotatably provided at a lower part of the body;
   a cargo box provided at an upper part of the body;
   an inertial measurement sensor configured to measure a tilt angle of the body;
   a pair of wheel encoders configured to measure a rotational angle of each of the pair of wheels;
   a cargo box encoder configured to measure a tilt angle of the cargo box;
   a pair of wheel motors configured to transmit a torque to each of the pair of wheels;
   a cargo box motor configured to transmit a torque to the cargo box; and
   a controller configured to:
     control the pair of wheel motors and the cargo box motor to allow the robot to make a double axis inverted pendulum motion on an axis of each of the pair of wheels and the cargo box, based on an output from each of the inertial measurement sensor, the pair of wheel encoders, and the cargo box encoder,
     determine, based on the robot being balanced by the double axis inverted pendulum motion, a slope of a current position of the robot based on the torque applied to the cargo box, the torque applied to the pair of wheels, and the tilt angle of the body, and
     determine a ratio between the tilt angle of the body and the tilt angle of the cargo box based on the slope to thereby move the robot while maintaining balance.

2. The robot of claim 1, wherein the controller is configured to estimate the slope using (i) the output of each from the inertial measurement sensor, the pair of wheel encoders, and the cargo box encoder, as state variables and (ii) the torque applied to the cargo box and the torque applied to the pair of wheels, as control input.

3. The robot of claim 2, wherein the controller is configured to estimate the slope based on (i) a correlation among the state variables and the control input, (ii) a mass and a dimension of each of the body, the pair of wheels, and the cargo box, and (iii) a gravitational acceleration.

4. The robot of claim 2, wherein the controller is configured to determine a target tilt angle of the body and a target tilt angle of the cargo box to move the robot while maintaining balance in the slope, based on the ratio between the tilt angle of the body and the tilt angle of the cargo box.

5. The robot of claim 4, wherein the controller is configured to determine the ratio between the tilt angle of the body and the tilt angle of the cargo box in the slope based on the tilt angle of the body, the tilt angle of the cargo box, and an angular speed of the pair of wheels being constant.

6. The robot of claim 5, wherein the controller is configured to determine the ratio between the tilt angle of the body and the tilt angle of the cargo box based on a slope determined in real time while the robot is moving, to thereby adaptively change the target tilt angle of the cargo box.

7. The robot of claim 5, wherein the controller is configured to:
determine the target tilt angle of the cargo box to ensure the cargo box is parallel to a ground, and
determine the target tilt angle of the body based on a ratio among the determined target tilt angle of the cargo box, the tilt angle of the body, and the tilt angle of the cargo box.

8. The robot of claim 4, wherein the controller is configured to perform feedback-control on the pair of wheel motors and the cargo box motor, based on an angular speed of the pair of wheels, the target tilt angle of the body, and the target tilt angle of the cargo box according to a movement command.

9. The robot of claim 1, wherein the controller is configured to determine a slope in each of the pair of wheels, and determine an average of the slope in each of the pair of wheels as the slope of the current position.

10. The robot of claim 9, wherein the controller is configured to adjust an output of each of the pair of wheel motors based on the slope in each of the pair of wheels.

11. A method for controlling a robot comprising a body, a pair of wheels rotatably provided at a lower part of the body, and a cargo box provided at an upper part of the body, the method comprising:
controlling a pair of wheel motors and a cargo box motor to allow the robot to make a double axis inverted pendulum motion on an axis of each of the pair of wheels and the cargo box, based on an output from each of an inertial measurement sensor, a pair of wheel encoders and a cargo box encoder, the pair of wheel motors configured to transmit a torque to each of the pair of wheels, the cargo box motor configured to transmit a torque to the cargo box, the inertial measurement sensor configured to measure a tilt angle of the body, the pair of wheel encoders configured to measure a rotational angle of each of the pair of wheels, and the cargo box encoder configured to measure a tilt angle of the cargo box;
determining, based on the robot being balanced by the double axis inverted pendulum motion, a slope of a current position based on the torque applied to the cargo box, the torque applied to the pair of wheels, and the tilt angle of the body; and
determining a ratio between the tilt angle of the body and the tilt angle of the cargo box based on the slope to thereby move the robot while maintaining balance.

12. The method of claim 11, wherein determining the slope comprises estimating the slope using (i) the output from each of the inertial measurement sensor, the pair of wheel encoders, and the cargo box encoder, as state variables and (ii) using the torque applied to the cargo box and the torque applied to the pair of wheels, as control input.

13. The method of claim 12, wherein determining the slope comprises estimating the slope based on (i) a correlation among the state variables and the control input, (ii) a mass and a dimension of each of the body, the pair of wheels and the cargo box, and (iii) a gravitational acceleration.

14. The method of claim 12, further comprising:
determining a target tilt angle of the body and a target tilt angle of the cargo box to move the robot while maintaining balance in the slope, based on the ratio between the tilt angle of the body and the tilt angle of the cargo box.

15. The method of claim 14, wherein determining the ratio between the tilt angle of the body and the tilt angle of the cargo box to determine the ratio between the tilt angle of the body and the tilt angle of the cargo box in the slope based on the tilt angle of the body, the tilt angle of the cargo box, and an angular speed of the pair of wheels being constant.

16. The method of claim 15, wherein determining the ratio between the tilt angle of the body and the tilt angle of the cargo box comprises determining the ratio between the tilt angle of the body and the tilt angle of the cargo box based on a slope determined in real time while the robot is moving, to thereby adaptively change the target tilt angle of the cargo box.

17. The method of claim 15, wherein determining the ratio between the tilt angle of the body and the tilt angle of the cargo box comprises:
determining the target tilt angle of the cargo box to ensure the cargo box is parallel to a ground, and
determining the target tilt angle of the body based on a ratio among the determined target tilt angle of the cargo box, the tilt angle of the body, and the tilt angle of the cargo box.

18. The method of claim 14, further comprising:
performing feedback-control on the pair of wheel motors and the cargo box motor, based on an angular speed of the pair of wheels, the target tilt angle of the body, and the target tilt angle of the cargo box according to a movement command.

19. The method of claim 11, wherein determining the slope comprises:
determining a slope in each of the pair of wheels, and
determining an average of the slope in each of the pair of wheels as the slope of the current position.

20. The method of claim 19, further comprising:
adjusting an output of each of the pair of wheel motors based on the slope in each of the pair of wheels.

* * * * *